(12) United States Patent
Epping et al.

(10) Patent No.: US 12,461,140 B2
(45) Date of Patent: Nov. 4, 2025

(54) TEST ARRANGEMENT FOR TESTING A POWER ELECTRONICS CONTROLLER

(71) Applicant: dSPACE GmbH, Paderborn (DE)

(72) Inventors: Daniel Epping, Paderborn (DE); Philipp Kemper, Paderborn (DE)

(73) Assignee: dSPACE GMBH, Paderborn (DE)

( * ) Notice: Subject to any disclaimer, the term of this patent is extended or adjusted under 35 U.S.C. 154(b) by 155 days.

(21) Appl. No.: 18/534,626

(22) Filed: Dec. 9, 2023

(65) Prior Publication Data

US 2024/0192265 A1 Jun. 13, 2024

(30) Foreign Application Priority Data

Dec. 9, 2022 (DE) ...................... 10 2022 131 851.6

(51) Int. Cl.
*G01R 31/28* (2006.01)
(52) U.S. Cl.
CPC ................................ *G01R 31/2832* (2013.01)
(58) Field of Classification Search
None
See application file for complete search history.

(56) References Cited

U.S. PATENT DOCUMENTS

| 10,601,357 | B2 | 3/2020 | Holthaus | |
|---|---|---|---|---|
| 11,567,138 | B2* | 1/2023 | Vuorio | B66B 5/0037 |
| 12,248,030 | B2* | 3/2025 | Bracker | G01R 31/42 |
| 2023/0168313 | A1 | 6/2023 | Bracker et al. | |
| 2024/0201248 | A1* | 6/2024 | Epping | G01R 31/2829 |
| 2024/0255566 | A1* | 8/2024 | Epping | G01R 31/2837 |

FOREIGN PATENT DOCUMENTS

| CN | 111781532 A | * 10/2020 | ............ G01R 31/42 |
|---|---|---|---|
| DE | 102022131865 A1 | 6/2023 | |
| EP | 3316477 A1 | 5/2018 | |

OTHER PUBLICATIONS

English translation of CN 111781532 A (Year: 2020).*
Dspace; "Power Hardware-in-the-Loop Testing" Closing the gap between HIL and dynamometer testing Sep. 2021.

* cited by examiner

*Primary Examiner* — Jermele M Hollington (74) *Attorney, Agent, or Firm* — Muncy, Geissler, Olds & Lowe, P.C.

(57) ABSTRACT

A test arrangement for testing a power electronics controller. An intermediate network current in the electrical intermediate network is reduced in that the intermediate network current flowing in the intermediate network is determined by the controller and the controller changes at least one control value of at least one of the load-side power electronics modules in such a way that the intermediate network current is reduced when the interface of the load-side power electronics module is applied with the modified control value.

9 Claims, 5 Drawing Sheets

TEST ARRANGEMENT FOR TESTING A POWER ELECTRONICS CONTROLLER

This nonprovisional application claims priority under 35 U.S.C. § 119(a) to German Patent Application No. 10 2022 131 851.6, which was filed in Germany on Dec. 9, 2022, and which is herein incorporated by reference.

BACKGROUND OF THE INVENTION

Field of the Invention

The present invention relates to a test arrangement for testing a power electronics controller, wherein the controller has supply connections for power supply and load connections for controlling an electrical load, with a plurality of power electronics modules, wherein each power electronics module has supply connections for power supply, at least one load connection for providing at least one electrical connection size, and an interface for controlling the power electronics module, wherein in the operational state of the test arrangement, the supply connections of the controller are each connected to the load connection of a power electronics module on the supply side for the provision of an electrical connection size to the supply connections of the controller, wherein in the operational state of the test arrangement, the load connections of the controller are each connected to the load connection of a power electronics module on the load side for the provision of an electrical connection size to the load connections of the controller, wherein the supply connections of the power electronics modules on the supply side and the supply connections of the power electronics modules on the load side are connected to each other via an intermediate electrical network, and wherein the interfaces of the power electronics modules on the supply side and on the load side are applied with control values by at least one controller for the purpose of adjusting the electrical connection sizes at the load connections of the power electronics modules.

Description of the Background Art

Test arrangements are known from the state of the art and are used to test power electronics controllers as they are used in very different areas of technology, for example in the automotive sector, in aerospace, but also in industrial applications such as process engineering. The power electronics controller is designed to control electrical loads, wherein the absolute amount of electrical power to be controlled is irrelevant. It is possible that only a few watts of power need to be handled, but it is also possible that power in the range of a few 100 KW (or more) need to be controlled.

A typical example of a power electronics controller in the automotive sector is an engine control unit for an electric motor. In a real application, i.e., not in the test with the test arrangement, the engine control unit is usually powered by a DC voltage source via its supply connections, and the load connections of the engine control unit are connected to the corresponding supply connections of the engine. For example, the DC voltage source is a battery. Depending on whether the connected electric motor is motor-driven or generator-driven, the energy flow through the power electronics controller can take place from its supply connections to the load connections, but also vice versa from the load connections to the supply connections.

In the test arrangement considered here, the environment of the controller to be tested is simulated power electronically with the test arrangement, i.e., no actual motor is connected to the load connections of the power electronics controller, but instead corresponding load-side power electronics modules; the use case is referred to as hardware-in-the-loop (HIL) simulation. Corresponding power electronics modules are also connected to the supply connections of the power electronics controller. With the power electronics modules, it is possible to simulate both electrical energy sources and electrical energy sinks. For this purpose, the power electronics module can be controlled via an interface in such a way that a certain electrical connection size is set at its load connection, i.e., a certain voltage or current.

It follows from the foregoing that the claimed test arrangement does not include for the power electronics controller to be tested itself, but the power electronics controller to be tested must be described in essence, otherwise the interaction of the components of the claimed test arrangement is not comprehensible. When it is stated that, in the operational state of the test arrangement, the supply connections and the load connections of the controller are each connected to the load connection of a power electronics module on the supply side or on the load side for the provision of an electrical connection size at the supply connections and the load connections of the controller, then this clearly means that in order to establish the operational state of the test arrangement, a connection of the power electronics modules included in the test arrangement is to be made with the corresponding connections of the power electronics controller not included in the test arrangement but to be tested; This means that the load connections of the power electronics modules can be connected to the supply connections and the load connections of the controller to be tested.

How the power electronics module has to be controlled via its interface, i.e., how it has to be applied with control values so that the desired electrical connection size is set at its load connection, is usually determined by calculating corresponding mathematical motor models and battery models on an HIL simulator. For this purpose, the real electrical connection sizes are detected by measurement, further processed within the framework of the mathematical models, taking into account the desired connection sizes according to the model, and corresponding control sequences, i.e., sequences of control values, calculated for the circuit breakers contained in the power electronics modules and output to the interface of the power electronics modules. This process is not of interest to the question pursued here, it is partly the subject of the European patent application with publication number EP 3316477 A1, for example.

The advantage of connecting the supply connections of the power electronics modules via the electrical intermediate network is that electrical energy can be exchanged between the power electronics modules. Only the energy that is dissipated by the test arrangement and the power electronics controller to be tested needs to be fed externally. It may therefore be the case that high electrical power is exchanged between the power electronics modules via the intermediate network, but only a small fraction of the power needs to be replenished via an external energy source, namely essentially the power required to operate the power electronics controller and the power electronics modules, including the actuator for generating the control values. The state of the art of this kind is described, for example, in the publication: dSPACE GmbH, "Power Hardware-in-the-Loop Testing; Closing the gap between HIL and dynamometer testing", product catalogue, September 2021.

In the actual use of a power electronics controller—i.e., not in the test case of a fully simulated environment using the test arrangement explained above—there is no intermediate electrical network that establishes an electrical connection between the supply side of the power electronics controller to be tested and the load side of the power electronics controller; In regular use of the power electronics controller, both sides are not galvanically connected to each other. What the use of the controller in the real environment and in the test arrangement has in common, however, is that the load connections of the controller are electrically indirectly connected to each other via the connected real (e.g., motor) or simulated (the power electronics modules) load.

For example, if the real load is a three-phase asynchronous motor, then the three strands of the asynchronous motor are connected to corresponding load connections of the controller on one side, and the three strands of the asynchronous motor are connected to each other in a star point on the other side. In real use, the total current at the star point and thus at the load connections of the controller always has to be zero.

However, the situation is somewhat different when using the power electronics controller in the test arrangement. The three strands of the asynchronous motor are simulated here by three power electronics modules, wherein in each case a load connection of a power electronics module is connected to a load connection of the controller to be tested. As a prerequisite, the supply connections of the power electronics modules also converge electrically here, because it is required that the supply connections of the power electronics modules on the supply side and the supply connections of the power electronics modules on the load side are connected to each other via an intermediate electrical network. The intermediate electrical network is a galvanic connection between the supply connections of the power electronics modules involved. In contrast to the application in the real world, the currents through the three load-side power electronics modules do not necessarily have to add up to zero, because possible residual currents can flow via the intermediate network as intermediate network current to the power electronics modules on the supply side and, of course, in the other direction.

Since in reality the currents over the load connections of the controller to be tested simply add up to zero due to a physical boundary condition (star point), this state should also be achieved during the operation of the controller in the test arrangement as far as possible, i.e., the intermediate network current should also be (near) zero if possible. In the test arrangements described, various circumstances lead to the fact that the intermediate network current is often non-zero, even if it is very small as compared to the currents over the individual load connections of the power electronics controller. Reasons include, for example, time delays in the recording of measured values, in signal processing, time delays due to calculations in the controller (battery model, motor model), measurement inaccuracies and quantization errors. In addition, in the case of large electrical loads to be simulated, power electronics modules are often operated in parallel, which can lead to increased inaccuracies and, as a result, intermediate network currents.

SUMMARY OF THE INVENTION

It is therefore an object of the invention to further develop a test arrangement such that any intermediate network currents that may occur are reduced.

In the test arrangement, the previously derived and demonstrated object is initially and essentially achieved by the fact that the intermediate network current flowing in the intermediate network is determined by the controller and the controller changes at least one control value of at least one of the load-side power electronics modules in such a way that when the interface of the load-side power electronics module is applied with the modified control value, the intermediate network current is reduced. A solution to the problem is therefore made possible by the fact that the fault current to be reduced, i.e., the intermediate network current to be reduced, is first recorded by the controller to begin with, and the controller, knowing the size of the intermediate network current, selectively influences at least one of the load-side power electronics modules, namely in such a way that the intermediate network current is reduced. The influence is exerted by changing the control value of at least one of the load-side power electronics modules.

Even if a mere reduction of the intermediate network current by recording the intermediate network current and corresponding influencing of the control value of at least one of the load-side power electronics modules already represents an improvement, it is further provided in an example of the test arrangement that the at least one control value of at least one of the load-side power electronics modules is modified in such a way that the intermediate network current is minimized, in particular to zero. The minimization of the intermediate network current can be understood as setting the smallest possible intermediate network current within the scope of the technical possibilities, i.e., the hardware configuration of the test arrangement, which cannot be reduced further, for example due to quantization effects when using analog/digital converters or digital/analog converters. However, the determination of the intermediate network current by the controller indicates that the intermediate network current has not been set to zero. When the intermediate network current is set to zero, the determination of the intermediate network current by the controller actually results in a value of zero. Within the framework of the setting and measuring accuracy of the test arrangement, the best possible result is actually achieved in this case.

Another preferred further development of the test arrangement is that the controller can modify the control values of all load-side power electronics modules in such a way that when the interfaces of all load-side power electronics modules are applied with the modified control values, the intermediate network current is reduced, in particular wherein all load-side power electronics modules make an equal percentage or an equal absolute contribution to the reduction of the intermediate network current. In the latter case, all power electronics modules contribute to the same extent to the reduction of the intermediate network current and are therefore equally loaded.

There are several ways in which the test arrangement or the controller of the test arrangement determines the intermediate network current. In an example of the test arrangement, the intermediate network current can be determined by the controller measuring the intermediate network current directly in the intermediate network.

The intermediate network current can be determined by the controller measuring the load connection currents via the load connections of the power electronics modules on the supply side and by forming a suitable difference from the measured load connection currents. If, for example, several power electronics modules on the supply side operate on a supply connection of the controller to be tested, then these currents are combined additively. A suitable difference here would therefore be the difference between the sum currents on the existing supply connections of the controller to be tested.

The intermediate network current can be determined by the controller calculating a suitable difference from the control values with which the interfaces of the power-supply electronics modules are applied. For the calculation of the intermediate network current, it has proven to be advantageous to use the slower variable control values for the power electronics modules on the supply side as compared to the more rapidly changing control values for the power electronics modules on the load side of the controller to be tested. The reason for the different variability of the control values for the power electronics modules on the supply side and the load side is due to the fact that the power electronics modules on the supply side work on the DC link of the controller to be tested, i.e., usually on a fixed reference voltage, whereas the load-side power electronics modules rely on the rapidly switching output potentials of the inverter of the controller to be tested. i.e., on rapidly switching and constantly changing voltages. This difference is also the reason why there are usually larger faults in the current control on the load side than is the case on the supply side. However, the resulting fault current, i.e., the resulting intermediate network current, is the same on the supply side and the load side of the power electronics controller to be tested, because the circuit is closed via the controller.

The intermediate network current can be determined by the controller measuring the supply connection currents via the supply connections of the load-side power electronics modules and by forming the total current from the measured supply connection currents.

It is easily possible to combine the various methods for determining the intermediate network current, which results in advantages, for example, in terms of reliability through redundancy, the increase in measurement reliability and measurement accuracy by combining measured values, and the internal monitoring of the test bench through plausibility checks of measured values.

The measured values of the measured currents can be filtered with a filter, for example, with a low-pass, a bandpass, a spike or a peak filter. In a further advantageous design of the test arrangement, the intermediate current values determined by the device are filtered with a filter, in particular with a low-pass, a bandpass, a spike or a peak filter. This filtering removes or suppresses unwanted signal components from the captured signals, which simplifies subsequent signal processing.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way

DETAILED DESCRIPTION

FIGS. 1 to 5 each show a test arrangement 1 for testing a power electronics controller 2. The controller 2 is not part of the test arrangement 1, but the test arrangement 1 can only be meaningfully described if the use case of the test arrangement 1 is explained in connection with a power electronics controller 2.

The controller 2 has supply connections 3 for power supply and load connections 4 for controlling an electrical load. In the real use of the power electronics controller 2, which is not shown here, i.e., the use of the controller 2 not in connection with the test arrangement 1, the supply connections 3 would be connected to a battery 3, for example, and the load connections 4, for example, to the connections of an electric drive, for example an asynchronous motor. In the examples shown, the test arrangement 1 replaces this environment of the power electronics controller 2 in order to simulate a real working environment for the controller 2. The examples therefore show hardware-in-the-loop test scenarios.

Each power electronics module 5 has supply connections 6 for power supply, at least one load connection 7 for providing at least one electrical connection size and an interface 8 for controlling the power electronics module 5.

In the operational state of the test arrangement 1, i.e., with the power electronics controller 2 present, as shown in the figures, the "real" energy source (e.g., battery) and the "real" load (e.g., asynchronous motor) are each replaced by power electronics modules 5. In the operational state of the test arrangement 1, the supply connections 3 of the controller 2 are each connected to the load connection 7 of a power electronics module 5 on the supply side to provide a desired electrical connection size at the supply connections 3 of the controller 2. Likewise, in the operational state of the test arrangement 1, the load connections 4 of the controller 2 are each connected to the load connection 7 of a load-side power electronics module 5 to provide a connection size at the load connections 4 of the controller 2. It is important to note here that in the examples, the supply connections 6 of the supply-side power electronics modules 5 and the supply connections 6 of the load-side power electronics modules 5 are connected to each other via an electrical intermediate network 9, i.e., they are galvanically connected to each other.

Test arrangements 1 with an electrical intermediate network 9, which electrically connects all supply connections 6 of the power electronics modules 5 with each other, have a considerable advantage over test arrangements that do not have such an electrical intermediate network. Electrical energy can be exchanged between the power electronics modules 5 via the electrical intermediate network 9, so that only the energy needed for the pure operation of the test arrangement 1 and the controller 2 has to be replenished externally, but it is not necessary to constantly feed the electrical energy from outside into the test arrangement 1, which would be consumed by the electrical load in a real application. If, for example, an electric drive with an output of 10 KW is simulated by the load-side power electronics modules 5 in motor operation, in which 10 KW are actually consumed, then an output of 10 KW does not have to be constantly fed into the test arrangement 1 from outside, but only the energy dissipated for the operation of the power electronics modules 5 and the controller 2, possibly only 100 W.

Figure 1:
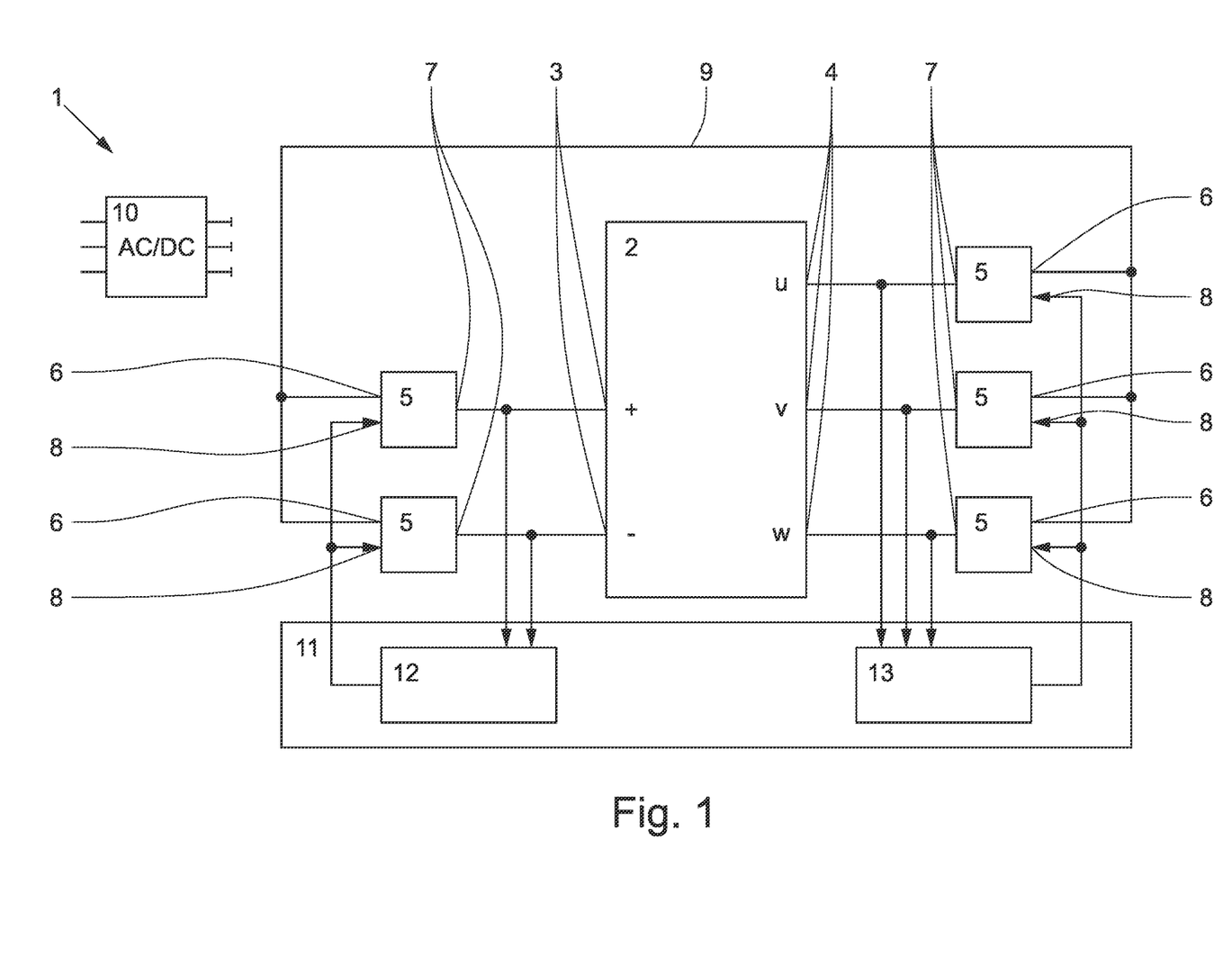
FIG. 1 shows schematically, a test arrangement for testing a power electronics controller as known from the state of the art.
Figure 2:
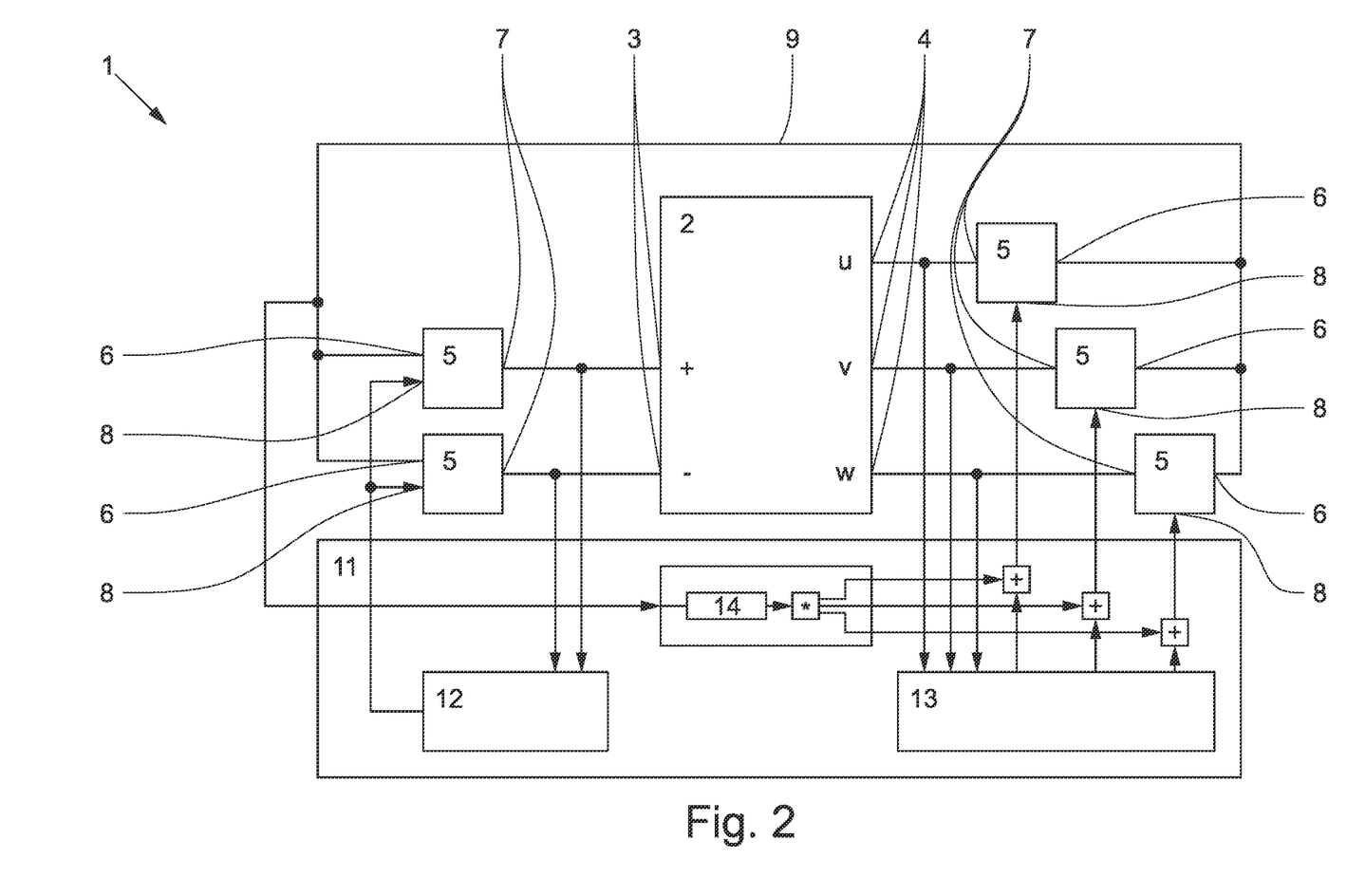
FIG. 2 shows schematically, a test arrangement in which the intermediate network current flowing in the intermediate network is determined by the controller of the test arrangement by direct measurement of the intermediate network current.

FIG. 1, which represents a test arrangement 1 known from the state of the art, schematically shows such an external power supply 10. In principle, this external power supply 10 is also present in the other examples in the other figures, but it has been omitted there for reasons of clarity. In the example, the external power supply 10 is supplied by a 3-phase AC mains on the input side and supplies a DC voltage as supply voltage (+DC, −DC, D0). This external power supply 10 then feeds the power electronics modules 5. In the examples shown, the electrical intermediate network 9 is a direct voltage intermediate network, wherein the test arrangements 1 shown and their operation can also be implemented with an alternating voltage intermediate network.

The interfaces 8 of the supply-side and the load-side power electronics modules 5 are applied with control values by a controller 11 for the purpose of setting electrical connection sizes at the load connections 7 of the power electronics modules 5. The electrical connection sizes that are set are usually determined by specifications from corresponding mathematical battery models and corresponding mathematical load models, such as mathematical motor models. Such energy source models 12 and load models 13 are shown schematically in FIGS. 1 to 5. How the controller 11 is implemented in terms of hardware, i.e., on a circuit board, on several circuit boards, on a chip, with a multi-chip system, with a simulator that has even more functional capabilities, is irrelevant for the aspect of the test arrangement 1 considered here.

The great advantage of the electrical intermediate network 9 comes at the price of possible inaccuracy, which is hardly significant in practice, but should nevertheless be avoided as much as possible. Many real electrical loads are configured in such a way that they bring together several load connections of the controller, at least indirectly, a typical example is the star point of an asynchronous motor. This circumstance physically forces the currents flowing over the load connections 4 of the controller 2 to always add up to exactly zero. Such a hard physically enforced boundary condition does not exist in the test arrangements 1 described, since the power electronics modules 5 on the supply side and on the load side are connected to each other via the electrical intermediate network 9.

As can be seen from FIG. 1, the load currents flowing through the load connections 4 of the controller 2 do not necessarily have to add up to zero, since a possible residual current can flow in or out via the electrical intermediate network 9. The occurrence of such an intermediate network current obviously does not correspond to the real physical behavior, i.e., when the controller 2 is operated in its real environment; therefore, such intermediate network currents should be avoided. The fact that such intermediate network currents occur at all can have various causes, such as delay times in signal processing, quantization errors, power electronics modules operated in parallel; This has been described in detail before.

FIGS. 2 to 5 illustrate various solutions for how to deal sensibly with the intermediate network current. What the examples in FIGS. 2 to 5 have in common is that the intermediate network current flowing in the intermediate network 9 is determined by the controller 11, and the controller 11 changes at least one control value of at least one of the load-side power electronics modules 5 in such a way that the intermediate network current is reduced when the interface 8 of the load-side power electronics module 5 is applied with the modified control value. In other words, the idea is to first detect the intermediate network current and, knowing the size of the intermediate network current, to act on at least one load-side power electronics module 5 in such a way that the intermediate network current is at least reduced, which is an improvement over the unaffected state.

The test arrangements 1 shown in FIGS. 2 to 5 are designed in such a way that the controller 11 modifies the control values of all load-side power electronics modules 5 in such a way that the intermediate network current is reduced when the interfaces 8 of all load-side power electronics modules 5 are applied with the modified control values. In the test arrangements 1, the controllers 11 are designed in such a way that all the power electronics modules involved on the load side make an equal absolute contribution to the reduction of the intermediate network current, in the present case in the amount of one third of the intermediate network current.

The test arrangements 1 in FIGS. 2 to 5 differ in the way in which the intermediate power is determined by the controller 11. In the test arrangement 1 according to FIG. 2, the intermediate network current is determined by the controller 11 measuring the intermediate current directly in the intermediate network 9, indicated by the signal line on the left side of the intermediate network 9. The recorded signal in the form of the measured intermediate network current is then processed by a filter 14, here in the form of a bandpass, and then divided into the control values of the load-side power electronics modules 5 via a multiplier block. In the present case, one third of the intermediate network current determined by measurement is compensated in each of the three load paths U, V, W.

Figure 3:
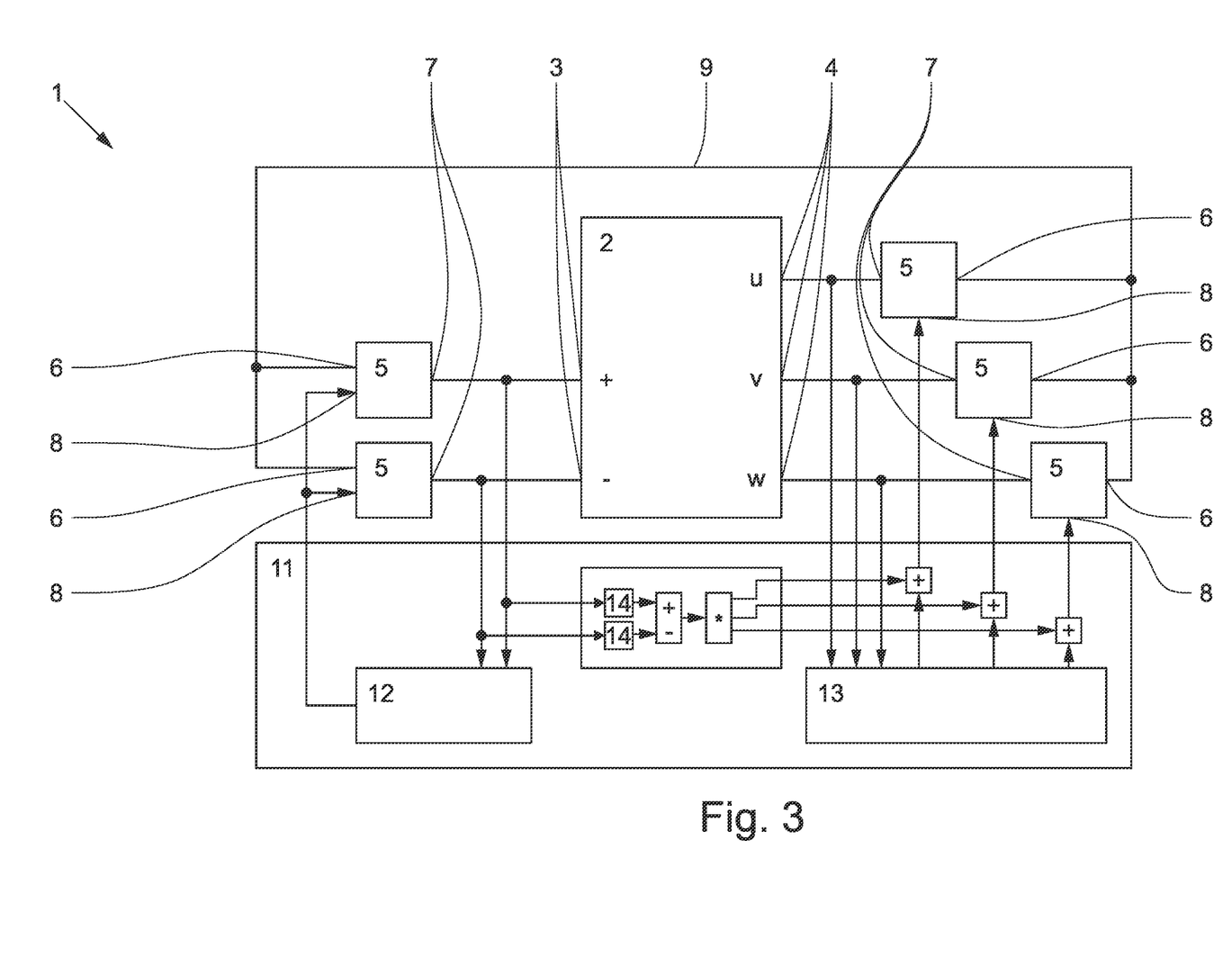
FIG. 3 shows schematically, a test arrangement in which the controller detects the intermediate network current by measuring the load connection currents via the load connections of the power electronics modules on the supply side.

In the test arrangement 1 according to FIG. 3, the intermediate network current is determined by the controller 11 measuring the load connection currents via the load connections 7 of the power electronics modules 5 on the supply side and forming a difference from the measured load connection currents. Here, the measured values are filtered through filters 14 before they are then charged to the intermediate network current (differential formation).

Figure 4:
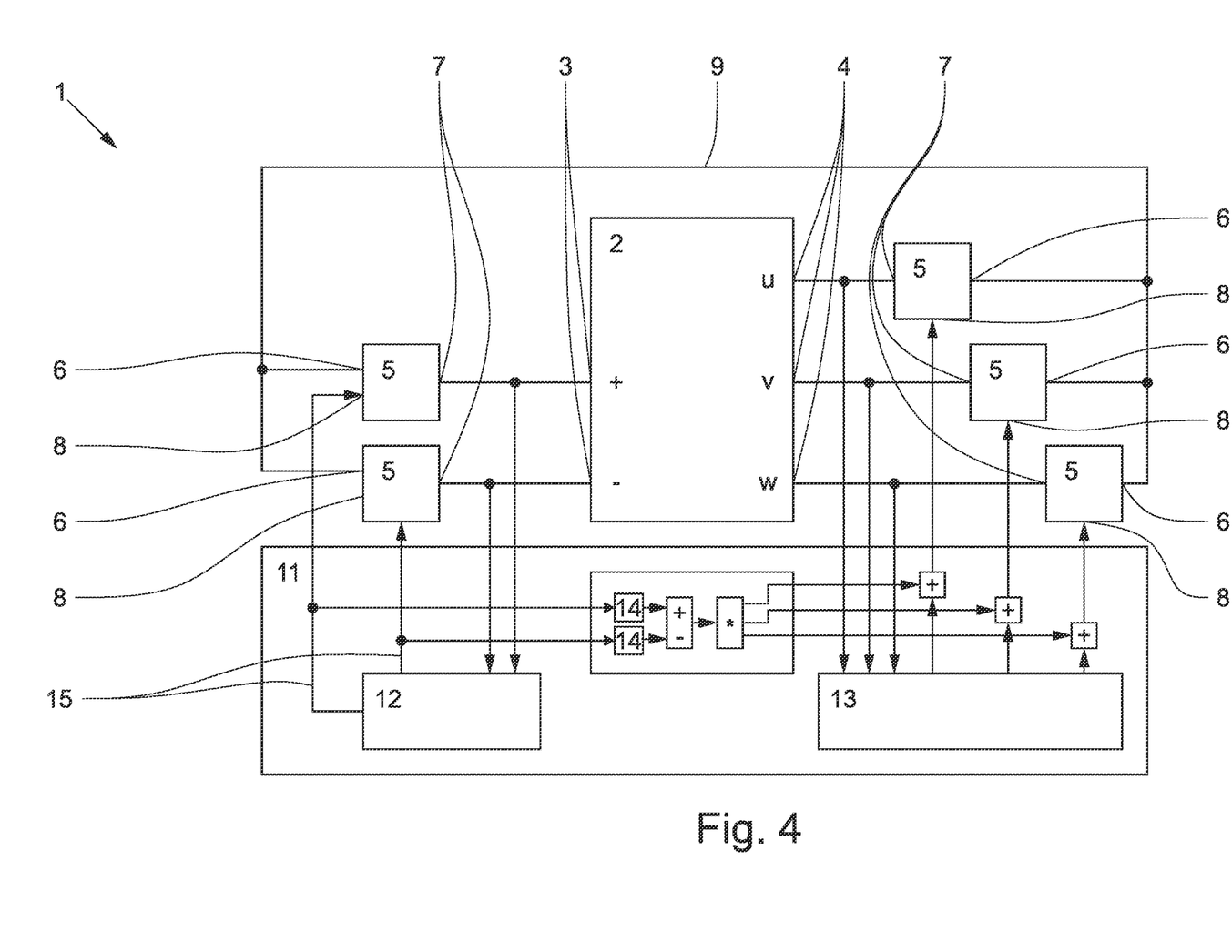
FIG. 4 shows schematically, a test arrangement in which the controller determines the intermediate network current from the control values of the power electronics modules on the supply side.

The test arrangement 1 according to FIG. 4 does not require a metrological determination of physical quantities, because the intermediate network current is determined by the controller 11 calculating a difference from the control values 15, with which the interfaces 8 of the power electronics modules on the supply side are applied. If the controller 2 is used in a "real" working environment in which there can be no intermediate network current, in which all currents flowing over the load connections 4 of the controller 2 add up to zero, and consequently the currents flowing via the supply connections 3 of the controller 2 necessarily add up to zero, there can be no residual currents on the supply side and on the load side. However, since residual currents are possible in the case of operation of the controller 2 with the test arrangements 1 described, i.e., intermediate network currents can occur, this is also reflected in the control values 15 differing in magnitude for the currents of the power electronics module 5 on the supply side.

Figure 5:
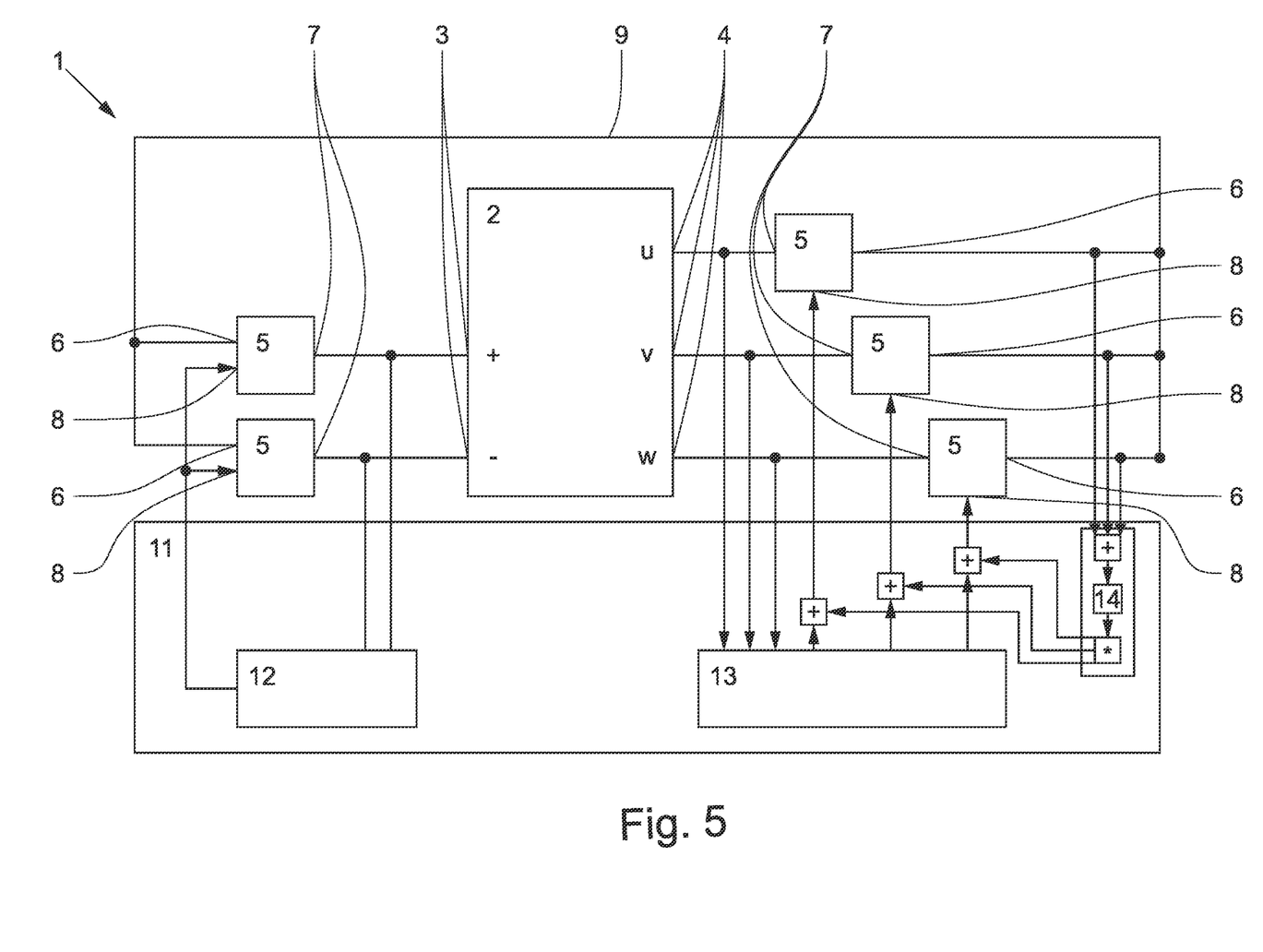
FIG. 5 shows a test arrangement in which the controller detects the intermediate network current by measuring the supply connection currents via the supply connections of the load-side power electronics modules.

Finally, FIG. 5 shows a test arrangement 1 in which the intermediate network current is determined by the controller 11 in that the supply connection currents are measured via the supply connections 6 of the load-side power electronics modules 5 and the sum current is formed from the measured supply currents. In this example, the filter 14 is only applied to the determined intermediate network current.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A test arrangement for testing a power electronics controller, the controller comprising:
   supply connections for power supply and load connections for controlling an electrical load; and
   at least two power electronics modules that each have a supply connection for power supply, at least one load connection to provide at least one electrical connection size, and an interface to control the power electronics module,
   wherein, in an operational state of the test arrangement the supply connections of the controller are each connected to the load connection of a power electronics module on the supply side for the provision of an electrical connection size at the supply connections of the controller,
   wherein, in the operational state of the test arrangement, the load connections of the controller are each connected to the load connection of a load-side power electronics module for the provision of an electrical connection size at the load connections of the controller, the supply connections of the supply-side power electronics modules and the supply connections of the load-side power electronics modules being connected to each other via an intermediate electrical network, and the interfaces of the supply-side and the load-side power electronics modules being applied with control values by at least one controller for setting electrical connection sizes at the load connections of the power electronics modules,
   wherein an intermediate network current flowing in the intermediate network is determined by the controller, and
   wherein the controller changes at least one control value of at least one of the load-side power electronics modules such that when the interface of the load-side power electronics module is applied with the modified control value, the intermediate network current is reduced.

2. The test arrangement according to claim 1, wherein the at least one control value of at least one of the load-side power electronics modules is modified such that the intermediate network current is minimized or approaches or is at zero.

3. The test arrangement according to claim 1, wherein the controller modifies the control values of all load-side power electronics modules such that when the interfaces of all load-side power electronics modules are applied with the modified control values, the intermediate network current is reduced, or wherein all load-side power electronics modules make an equal percentage or an equal absolute contribution to the reduction of the intermediate network current.

4. The test arrangement according to claim 1, wherein the intermediate network current is determined by the controller measuring the intermediate network current directly in the intermediate network.

5. The test arrangement according to claim 1, wherein the intermediate network current is determined by the controller measuring the load connection currents via the load connections of the power electronics modules on the supply side and by forming a suitable difference from the measured load connection currents.

6. The test arrangement according to claim 1, wherein the intermediate network current is determined by the controller calculating a suitable difference from the control values with which the interfaces of the supply-side power electronics modules are applied.

7. The test arrangement according to claim 1, wherein the intermediate network current is determined by the controller measuring the supply connection currents via the supply connections of the load-side power electronics modules and by forming the total current from the measured supply connection currents.

8. The test arrangement according to claim 4, wherein the measured values of the measured currents are filtered with a filter or with a low-pass, a bandpass, a spike or a peak filter.

9. The test arrangement according to claim 1, wherein the values of the intermediate current determined by the controller are filtered with a filter, a low-pass, a bandpass, or a spike or a peak filter.

* * * * *